United States Patent Office 2,884,334
Patented Apr. 28, 1959

2,884,334

CEMENT AND METHOD OF STABILIZING SOIL

Geoffrey W. Meadows, Kennett Square, Pa., assignor to E. I. du Pont de Nemours and Company, Wilmington, Del., a corporation of Delaware No Drawing. Application May 4, 1955
Serial No. 506,090

8 Claims. (Cl. 106—93)

This invention relates to cementitious products such as modified Portland cement, concrete and soil-cement, and methods for their preparation. More specifically, it relates to such products and processes in which a cellulose xanthate and calcium oxide are mixed or used with Portland cement.

I have found that the use of a cellulose xanthate and calcium oxide in combination with Portland cement greatly modifies the properties of the resulting cement-containing mixes.

In the preparation of concrete, it is the common expedient to use more water than is required for the hydration of the cement. This is done in order to achieve adequate flowability or consistency of the wet concrete mix, but the strength of the resulting concrete suffers. One unexpected advantage obtained from the inclusion of the cellulose xanthate and calcium oxide in cement, or in the preparation of a wet concrete mix, is that it makes possible a marked reduction in the amount of water required in order to obtain satisfactory fluidity or consistency of wet concrete mix, and thus makes possible concrete of increased strength. More striking is the modification of the setting time for concrete resulting from the use of the cellulose xanthate-calcium oxide combination according to this invention.

Various beneficial results are also obtained by the use of a cellulose xanthate and calcium oxide in combination with Portland cement in the preparation of soil-cement. Soil-cement is the product made by the intimate mixing of wet soil with cement followed by compacting of the mixture. The practice of making soil-cement is commonly used with certain soils in the preparation of road and airport runway surfaces or subgrades, earth dams, earth upon which buildings are to be constructed, and like uses in which structural strength is desired at minimum expense.

The preparation of soil-cement has, in a practical sense, been limited to the use of soils of relatively low clay content, for example, soils having a plasticity index less than about 15. Plasticity index is a numerical criterion commonly employed in soil engineering and is defined in Lambe, "Soil Testing for Engineers," chapter III, pages 23 and 26 (John Wiley and Sons, 1951).

The use of soils having a plasticity index greater than about 15 in the preparation of soil-cement has heretofore been impractical because the wet soil which must be thoroughly mixed with cement in the process is exceptionally sticky and cannot be handled in the mechanical equipment adapted for the making of soil-cement. I have found, however, that by the inclusion of a cellulose xanthate and calcium oxide that such high clay soils exhibit a greatly changed form in the mixing operation with Portland cement. Instead of being viscous, sticky, unmanageable muds or pastes, the mass becomes crumbly or granular in nature and mixing is readily carried out.

In addition to making relatively high clay soils useable in the preparation of soil-cement, the inclusion of a cellulose xanthate and calcium oxide additionally makes possible a great reduction in the amount of cement needed to obtain a soil-cement of a given strength or load bearing capacity.

Thus, while the invention is especially beneficial in the preparation of soil-cements from high clay soils such as those having a plasticity index greater than about 15, it will be seen that benefits are also obtained in the manufacture of soil-cement from soils having lower plasticity indices primarily because of the permissible use of lesser amounts of Portland cement to obtain a soil-cement of satisfactory strength.

Additionally, in order that newly laid soil-cement develop strength, it has been the practice to retard moisture evaporation by covering it with straw, paper, or other covering material, or to wet it down occasionally over a period of several days. I have found that this additional operation can be eliminated thru the use of the cellulose xanthate-calcium oxide compositions of this invention and the soil-cement will nevertheless develop strength.

The term "Portland cement" is used herein to include generally the kind of product obtained by heating lime-clay mixtures, or natural cement-rock, to such a temperature that practically the entire product is sintered, followed by grinding. Various additives can be included in accordance with conventional Portland cement manufacturing practices.

The cellulose xanthates employed in the compositions and methods of this invention are prepared by soaking cellulose in an alkali and then treating the alkali cellulose which is formed with carbon disulfide. This method is well known since it is used to prepare cellulose xanthate in processes for the manufacture of rayon fiber and cellophane. Thus cellulose xanthate salts such as the sodium or potassium salts are made according to such methods, for example, by treating pulped, shredded, or otherwise finely divided cellulose with strong sodium or potassium hydroxide solution and the resulting material is then treated with carbon disulfide. The method and the details of chemistry involved are fully described in Heuser "The Chemistry of Cellulose," John Wiley and Sons, 1944, chapter 8.

The cellulose xanthates employed in the processes of this invention are conveniently represented by the formula $$[C_6H_{10-n}O_5(CSSA)_n]_x$$

where $n$ represents the degree of xanthation and is from 0.1 to 3.0, and more preferably from 0.3 to 1.5; $x$ is the degree of polymerization; and A is a metal or other salt-forming group or ester-forming group such as methyl, ethyl, etc.

The cellulose xanthates can be prepared from high grade cellulose or more economically, they can be prepared by direct xanthation of crudes such as wood pulp, cotton linters, saw dust, corn cobs, seed hulls, straw, and waste paper.

Water solubility is a desired characteristic of the cellulose xanthates employed in the methods and compositions of this invention and this property is obtained by providing sufficient xanthation of the cellulose. With lower molecular weight polymers, water solubility is attained by having as little as an average of 0.1 xanthate groups per glucose unit while with the higher molecular weight polymers, somewhat greater xanthation, for example, in the order of at least 0.3 xanthate groups per glucose unit gives desired water solubility.

The cellulose xanthates are employed in the methods and compositions of this invention in the form of their salts or esters. Thus the radical A, shown in the above formula, can be a monovalent cation such as obtained from sodium, potassium, lithium, ammonium, tetra-methyl-ammonium, and other quaternary ammonium ions. Polyvalent cationic radicals can also be used, for example, magnesium, calcium, strontium, iron, zinc, aluminum, copper and barium. A radical A can be also organic so that the resulting compound is a xanthate ester; thus A can be methyl, ethyl, propyl, isopropyl, or other organic radicals linked to the xanthate radical thru carbon, and more preferably such organic radicals substituted with water solubilizing groups such as hydroxyl or carboxyl.

The proportions of Portland cement, cellulose xanthate and calcium oxide used in the products and processes of the invention can be varied within fairly wide limits depending upon the particular use for which the mixture is intended. In general, the products of the invention will contain, or the processes will employ, at least 0.1% by weight of a cellulose xanthate based on the weight of the Portland cement and at least 0.1 part by weight of the calcium oxide per part by weight of the cellulose xanthate.

If the cellulose xanthate, calcium oxide and Portland cement are to be employed in the manufacture of concrete by admixture with a mineral aggregate such as sand, gravel, or a mixture of such materials, or their equivalents, the cement will ordinarily constitute, in accordance with conventional practices, more than about 10% by weight of the mineral aggregate, and usually from about 15% to 30% of the weight of the mineral aggregate. The cellulose xanthate will ordinarily be used in amount from 0.1% to 5% by weight of the Portland cement, although larger amounts can be used if desired. In general, the calcium oxide used will constitute from 0.1 to 10 parts by weight per part by weight of the cellulose xanthate, the use of larger amounts, although permissible, not being necessary.

More specifically, the use of cellulose xanthate in processes of the invention in amount from about 0.1% to about 2.3%, and more preferably in the order of from about 0.5% to 2% by weight, based on the weight of the Portland cement brings about a marked acceleration of the setting time of concrete as will be illustrated in detailed examples hereinafter. The advantages of short setting time are, of course, apparent in many uses and such property is especially valuable in the pouring and setting of concrete during cold weather when freezing can be a problem if the setting period is extended.

Use of greater amounts, and preferably in the order of about 2.5% to 5% by weight of the cellulose xanthate, effects a retardation of setting of the wet concrete and thus becomes useful in preparing in situ concrete casings for deep wells with the objective of sealing off permeable strata and like uses where it is desired to maintain fluidity of the wet concrete mix for an extended period to permit its transportation or flowing to the desired location.

If a soil-cement is to be prepared according to this invention, it is in general preferred to employ from about 1% to 15% by weight of Portland cement based on the dry weight of the soil, from 2% to 100% by weight of a cellulose xanthate based on the weight of the Portland cement and from 0.1 to 10 parts by weight of calcium oxide per part by weight of the cellulose xanthate.

In the manufacture of soil-cement, the stabilizing additives, that is, the Portland cement, the cellulose xanthate and the calcium oxide can be applied to the soil according to conventional soil stabilizing techniques for preparing a compacted mixture of soil and stabilizing materials. One such technique and the one commonly used involves first incorporating the stabilizing additives into the soil in a manner to insure thorough mixing. In the case, for example, of preparing an airport runway or a road, the soil to be treated can be taken up, mixed with the stabilizing additives, and then returned to the ground, levelled, and compacted by tamping or rolling equipment. In the practice of such methods, the stabilizing additives are generally added to the soil as dry powders and they can be premixed before addition to the soil, if desired, or alternatively added separately. The calcium oxide is preferably premixed with the cellulose xanthate prior to addition to the soil and the Portland cement can also be premixed with the xanthate and calcium oxide if convenient but such premixing is not in any way essential.

Alternatively, in the preparation of runways, roads, and the like, the stabilizing additives in dry form can be incorporated in the soil by a method which involves first spreading the stabilizing additives on the surface of the soil in situ, followed by the step of breaking up the soil and mixing it on the subgrade by means of mechanical equipment and then compacting.

The presence of free water in the soil is necessary in practicing the soil stabilization processes of the invention. The amount of water needed to give optimum results varies considerably with the kind of soil involved. For best results, one should first run a compaction test on the soil to be treated to determine the optimum water content for that soil; and then adjust the amount of water in the soil as indicated by the test, such adjustment being made either before, during, or shortly after admixture of the stabilizing agent with the soil. Standard compaction test procedures are described by Lambe, Soil Testing for Engineers, chapter V (John Wiley and Sons, 1951).

It will be understood that the pressure used in compacting can be varied widely in accordance with conventional practices. For example, pressures from about 200 to 2000 pounds per square inch can be used in case of rolling; or in terms of compactive energy from about 5,000 to 50,000 ft.-lb./cu. ft. in the case of tamping.

The invention is further illustrated by the following examples in which there is shown a representative cellulose xanthate, the application of cellulose xanthates in the manufacture of cementitious products, and the results obtained thru the joint use of cement, a cellulose xanthate, and calcium oxide in the preparation of concrete and in the stabilization of soils.

*Example 1*

40 parts by weight of cotton linters having a degree of polymerization of about 1130 are steeped in 660 parts by weight of an 18% sodium hydroxide solution for 60 minutes. The resulting alkali cellulose is then pressed to a weight ratio of 2.84 to 1 based on the original dry cellulose, shredded, and carbon disulfide is added in amount corresponding to 75% by weight based on the initial dry cellulose. Xanthation is carried out with agitation at 25° C. for 6 hours.

The cellulose xanthate crumbs which form are dried in a stream of warm air at about 70° C. to a water content of 5.3% and the product is ground in a hammer mill using a 0.013 inch herring bone screen.

The sodium cellulose xanthate powder prepared as above contains about 0.80 xanthate groups per glucose unit.

Sodium cellulose xanthate powder prepared as above is intimately mixed with powdered calcium oxide in equal parts by weight, i.e. to give a mixture containing one part by weight of calcium oxide for each part by weight of the sodium cellulose xanthate.

The sodium cellulose xanthate-calcium oxide prepared as above is used in combination with Portland cement to convert a dirt road to a soil-cement road. The top six to eight inches of the dirt road, the soil of which is found to contain 35% by weight clay, 12% by weight water, and have a plasticity index of 26, is taken up in a single pass type soil stabilizing machine wherein it is mixed with 4% by weight of Portland cement based on the dry weight of the soil and 2% by weight of the above described sodium cellulose xanthate-lime mixture based on the dry weight of the soil. Water is added to raise the water content of the soil to 18% by weight.

The moist crumbly mixture attained in the above mixing operation is returned to the excavated area from which the soil had been removed and then compacted in place with a sheep's foot roller and the surfaces subsequently shaped with a scraper and finely compacted using a pneumatic tired roller.

No protective covering is applied to the newly laid and compacted soil-cement to retard evaporation. After two days, the soil-cement road is capable of carrying vehicles.

After exposure to rain, freezing and thawing, the soil-cement road remains in its compacted condition in contrast to untreated compacted dirt road which in wet weather becomes a quagmire.

While the foregoing illustrates a valuable use of compositions and methods of the invention, certain standard test procedures are useful for obtaining numerical comparisons. For example, soil stabilizing compositions are applied to soil and evaluated as described below:

The soil used is a Hybla Valley clay obtained from Alexandria, Virginia. It contains 48% sand, 20% silt, and 32% clay and has a plasticity index of 24.

50 parts by weight of Portland cement are mixed with 430 parts of the air-dried soil which has been screened thru a one-quarter inch mesh screen. 112 parts by weight of water are added and the composition mixed to uniform consistency. 20 parts by weight of the sodium cellulose xanthate-lime mixture prepared as described heretofore in this example are added and upon further working of the mass, the sticky plastic clay is converted to a loose granular mix.

The soil so treated is then compacted in a rectangular mold to give a block 1" x 3" x 6". The compacting load is applied at the rate designated in the Porter test static compaction procedure. In this procedure, a high rate of compression is applied until 100 p.s.i. is reached and the the sample is compressed further at a rate of 0.10 inch per minute until 1000 p.s.i. is reached at which point the rate of compression is decreased to 0.05 inches per minute until 2000 p.s.i. is reached; the 2000 p.s.i. is maintained for one minute (see Lambe's Soil Testing for Engineers, page 46, Wiley and Sons, 1951).

The compressed block is permitted to air dry for 36 days and is then immersed in water for 40 days. The unconfined compressive strength of the block so treated is found to be 490 p.s.i. (see Lambe, supra, chapter 12). A compressed block similarly prepared except for the omission of the cellulose xanthate and lime disintegrates in a few hours upon immersion in water.

Example 2

A concrete foot path is formed using a mix consisting of 2.6 parts by weight of sand, 3.6 parts by weight of gravel, 0.5 part by weight of water, 0.01 part by weight of a sodium cellulose xanthate-calcium oxide mixture prepared as in Example 1, and one part by weight of Portland cement. After one hour, the foot path can be walked on without leaving an impression. The surface shows no sign of cracking or scaling after being subjected to traffic and weathering.

In contrast, a concrete foot path poured using the same mix except for the omission of the sodium cellulose xanthate and lime and a necessary increase to the amount of water to 0.6 part by weight to obtain the same consistency cannot be walked on for about 24 hours without leaving an impression. Some surface cracks and scaling appear after subjecting the foot path to traffic and weathering.

Example 3

This example illustrates the use of compositions and methods of the invention to modify the setting time of cement mixes.

50 parts by weight of sodium cellulose xanthate powder prepared as described in Example 1 is blended with 30 parts by weight of powdered calcium oxide. 10 parts by weight of this mix is added to 500 parts by weight of Portland cement and 124 parts by weight of water and the whole is mixed to uniform consistency. The resulting mix, which contains 19.6% water, is at "normal consistency" as determined by the Vicat needle procedure (ASTM Standard Methods, 1952, page 152). By comparison, the same Portland cement to which no cellulose xanthate or calcium oxide has been added requires 21.6% water to give a mix of "normal consistency."

The setting time of the xanthate-calcium oxide modified mix prepared as above in 20 minutes as determined by the Vicat needle method (ASTM Standard Methods, 1952, page 176). In contrast, the setting time of the unmodified cement mix at "normal consistency" is 180 minutes.

Another modified cement mix prepared as above except that the amount of the sodium cellulose xanthate-calcium oxide mixture employed is increased to 14 parts by weight has a water content of 19.2% by weight at normal consistency and a setting time of less than 20 minutes.

The setting time of a modified cement mix is found to be retarded to greater than 300 minutes in an evaluation of the kind described above in which the amount of sodium cellulose xanthate-calcium oxide mix employed is increased to 28 parts by weight for each 500 parts by weight of Portland cement, such wet mix at normal consistency having a water content of 19.1% by weight.

Additional examples follow to illustrate the valuable properties of soil cements of the invention as established by a dynamic compaction test developed by U. S. Army Engineers and currently used by the Bureau of Public Roads, Physical Research Branch.

Example 4

16 parts by weight of Portland cement are mixed with 400 parts by weight of an air-dried Hybla Valley clay soil of the kind described in Example 1 after having passed the soil through a one-quarter inch mesh screen. Seventy-five parts by weight of water are added and the resulting composition is thoroughly mixed to a uniform consistency. Eight parts by weight of a mixture consisting of equal parts by weight of sodium cellulose xanthate and lime are then added and the mass is again mixed whereupon it is converted from a sticky plastic clay to a loose granular mix.

The soil so treated is then charged in four approximately equal portions to a 2" diameter cylindrical mold. After the addition of each portion, the soil is compacted in the mold using a Vicksberg tamper to give a compressed cylindrical block 2" in diameter and approximately 4" long consisting of four horizontal sections tightly bound together. The compactive energy is provided by a 4-pound hammer falling 12", and 12 blows are delivered between successive additions of soil.

The compressed block tested immediately after preparation is found to have an unconfined compressive strength of 80 p.s.i. In contrast, the soil block prepared as described above but without the addition of the stabilizing additives has an initial unconfined compressive strength of only 49 p.s.i.

Another block, prepared as described above, using the Portland cement, cellulose xanthate and calcium oxide additives is air dried for 12 days and then immersed in water for 2 days. It has an unconfined compressive strength of 77 p.s.i. following the water immersion.

A test block, prepared as described above, aged for 12 days in an atmosphere maintained at 100% relative humidity and then immersed in water for 2 days has an unconfined compressive strength of 191 p.s.i.

A block, prepared as described above, aged for 30 days in an atmosphere of 30% relative humidity and immersed in water for 2 days has an unconfined compressive strength of 236 p.s.i.

In contrast, soil blocks prepared without the use of the soil stabilizing additives and aged under any of the above described conditions disintegrate upon immersion in water.

Example 5

16 parts of Portland cement are mixed with 400 parts of air-dried Hybla Valley clay soil of the kind described in Example 1. 75 parts by weight of water and 16 parts by weight of a mixture of sodium cellulose xanthate and calcium oxide in equal parts are added to the soil and mixed therewith to convert it to a loose granular mix. The soil so treated is then compacted as described in Example 4.

The compressed block when tested immediately after preparation has an unconfined compressive strength of 92 p.s.i. A similar block after drying for 12 days and immersion in water for 2 days has an unconfined compressive strength of 116 p.s.i.

While the invention has been described in detailed examples with particular reference to specific embodiments, it will be appreciated that no unnecessary limitations are to be understood therefrom. The invention is not limited to the exact details shown and described for obvious modifications will occur to those skilled in the art.

I claim:

1. A cementitious product in the form of a substantially dry mixture, the mixture consisting essentially of from 64.5 to 99.9% by weight of Portland cement, from 0.1% to 5% by weight of a cellulose xanthate based on the weight of said Portland cement and from 0.1 to 10 parts by weight of calcium oxide per part by weight of said cellulose xanthate.

2. A cementitious product consisting essentially of a major amount of soil in admixture with a substantially dry mixture from 1% to 15% by weight Portland cement based on the dry weight of said soil, from 2% to 100% by weight of cellulose xanthate based on the weight of said Portland cement and from 0.1 to 10 parts by weight of calcium oxide per part by weight of said cellulose xanthate.

3. A cementitious product consisting essentially of a major proportion of mineral aggregate, from 10% to 30% by weight of Portland cement based on the dry weight of said mineral aggregate, from 0.1% to 5% by weight of a cellulose xanthate based on the weight of said Portland cement, and from 0.1 to 10 parts by weight of calcium oxide per part by weight of said cellulose xanthate.

4. A stabilized soil prepared by a process consisting essentially of mixing wet soil, from 1% to 15% by weight of Portland cement based on the dry weight of said soil, from 2% by weight of a cellulose xanthate based on the weight of said Portland cement, from 0.1 to 10 parts by weight of calcium oxide per part by weight of said cellulose xanthate, and compacting said mixture and aging it.

5. A process for stabilizing soil which consists essentially of mixing a major proportion of wet soil with from 1% to 15% by weight of Portland cement based on the weight of said soil on a dry basis, from 2% to 100% by weight of a cellulose xanthate based on the weight of said Portland cement and from 0.1 to 10 parts by weight of calcium oxide per part by weight of said cellulose xanthate and subsequently compacting said mixture and aging it.

6. A method for stabilizing a clay soil which consists essentially of mixing a clay soil having a plasticity index greater than 15 with from 1% to 15% by weight of Portland cement based on the dry weight of said soil, from 2% to 100% by weight of a cellulose xanthate based on the weight of said Portland cement and 0.1 to 10 parts by weight of calcium oxide per part by weight of said cellulose xanthate, and subsequently compacting said mixture in a moist condition and aging the compacted mixture.

7. An accelerated-setting cement consisting essentially of a major proportion of Portland cement, from 0.1% to 2.0% by weight of a cellulose xanthate, based on the weight of Portland cement, and from 0.1 to 10 parts by weight of calcium oxide per part by weight of cellulose xanthate.

8. A retarded-setting cement consisting essentially of a major proportion of Portland cement, from 2.5% to 5.0% by weight of a cellulose xanthate, based on the weight of Portland cement, and from 0.1 to 10 parts by weight of calcium oxide per part by weight of cellulose xanthate.

References Cited in the file of this patent

UNITED STATES PATENTS

| | | |
|---|---|---|
| 2,285,302 | Patterson | June 2, 1942 |
| 2,655,004 | Wertz | Oct. 13, 1953 |

FOREIGN PATENTS

| | | |
|---|---|---|
| 575,798 | Great Britain | Mar. 6, 1946 |
| 112,179 | Australia | Dec. 17, 1940 |

UNITED STATES PATENT OFFICE

CERTIFICATE OF CORRECTION

Patent No. 2,884,334  April 28, 1959

Geoffrey W. Meadows

It is hereby certified that error appears in the printed specification of the above numbered patent requiring correction and that the said Letters Patent should read as corrected below.

Column 6, line 37, for "Sevently-five" read -- Seventy-five --; line 44, for "portion" read -- portions --; column 8, line 2, after "2%" insert -- to 100% --.

Signed and sealed this 8th day of September 1959.

(SEAL)
Attest:

KARL H. AXLINE
Attesting Officer

ROBERT C. WATSON
Commissioner of Patents